(12) United States Patent
Sishtla

(10) Patent No.: US 11,650,313 B1
(45) Date of Patent: May 16, 2023

(54) SYSTEM AND METHOD TO ADJUST OR SUPPRESS WINDSHEAR ALERT THRESHOLD FOR WEATHER RADAR

(71) Applicant: Rockwell Collins, Inc., Cedar Rapids, IA (US)

(72) Inventor: Venkata A. Sishtla, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/501,406

(22) Filed: Oct. 14, 2021

(51) Int. Cl.
| | | |
|---|---|---|
| *G01S 7/24* | (2006.01) | |
| *G01S 13/95* | (2006.01) | |
| *B64D 43/00* | (2006.01) | |
| *B64D 45/00* | (2006.01) | |
| *G08B 21/18* | (2006.01) | |

(52) U.S. Cl.
CPC ............ *G01S 13/953* (2013.01); *B64D 43/00* (2013.01); *B64D 45/00* (2013.01); *G08B 21/182* (2013.01)

(58) Field of Classification Search
CPC ....... G01S 13/953; B64D 43/00; B64D 45/00; G08B 21/182
See application file for complete search history.

(56) References Cited

U.S. PATENT DOCUMENTS

| | | | |
|---|---|---|---|
| 5,059,964 A | 10/1991 | Bateman | |
| 7,633,430 B1 | 12/2009 | Wichgers et al. | |
| 8,994,578 B1 * | 3/2015 | Finley | G01S 7/24 342/26 B |

(Continued)

FOREIGN PATENT DOCUMENTS

| | | | | |
|---|---|---|---|---|
| EP | 3046092 | * | 8/2014 | ............ G01S 13/89 |
| EP | 3067710 A1 | | 9/2016 | |

(Continued)

OTHER PUBLICATIONS

Collins Aerospace, WXR-2100 MultiScan ThreatTrack™ Weather Radar, URL: https://www.collinsaerospace.com/what-we-do/Commercial-Aviation/Flight-Deck/Surveillance/Weather-Radar/Wxr-2100-Multiscan-Threat-Track-Weather-Radar, downloaded Oct. 5, 2021, 8 pages.

(Continued)

*Primary Examiner* — Hongmin Fan
(74) *Attorney, Agent, or Firm* — Suiter Swantz pc llo

(57) ABSTRACT

A system including a radar receiver, a computer readable medium, and a processor. A data structure containing historical information pertaining to weather conditions for multiple locations may reside in the medium. The processor may be configured to: obtain aircraft data including information of an aircraft position; obtain external data; obtain a portion of the historical information pertaining to a location corresponding to the aircraft position; obtain weather radar data; analyze the weather radar data to determine if windshear exceeds a windshear alert threshold; upon an occurrence of the windshear exceeding the windshear alert threshold, determine whether to issue or suppress a windshear alert based on the aircraft data, the external data, and/or the portion of the historical information; and one of a) output the windshear alert for presentation to a user or b) adjust the windshear alert threshold causing the windshear alert to be suppressed and/or suppress the windshear alert.

17 Claims, 5 Drawing Sheets

(56) References Cited

U.S. PATENT DOCUMENTS

| | | |
|---|---|---|
| 9,869,766 B1 | 1/2018 | Breiholz et al. |
| 10,139,474 B2 | 11/2018 | Gurusamy et al. |
| 10,302,815 B1 | 5/2019 | Kronfeld et al. |
| 10,564,256 B2 | 2/2020 | West et al. |
| 10,809,375 B1 | 10/2020 | Dana et al. |
| 10,908,278 B2 | 2/2021 | Bunch et al. |
| 10,921,444 B2 | 2/2021 | Henderson et al. |
| 2007/0104026 A1* | 5/2007 | Rubin .................... G01W 1/10 367/13 |
| 2009/0184846 A1* | 7/2009 | Baillon ................ G01S 13/953 340/968 |
| 2022/0082687 A1* | 3/2022 | Sishtla ................ G01S 13/958 |

FOREIGN PATENT DOCUMENTS

| | | |
|---|---|---|
| EP | 2955481 B1 | 9/2017 |
| EP | 3789799 A1 | 3/2021 |

OTHER PUBLICATIONS

Extended European Search Report dated Mar. 15, 2023 in European Patent Application No. 22201254.4.

\* cited by examiner

SYSTEM AND METHOD TO ADJUST OR SUPPRESS WINDSHEAR ALERT THRESHOLD FOR WEATHER RADAR

BACKGROUND

For an airborne weather radar, detecting microbursts is challenging due to the presence of strong ground clutter. Ground clutter includes unwanted ground echoes and unwanted ground signals. Detecting hazardous weather is important for autonomous operation. For example, false alerts due to strong ground clutter targets or nuisance alerts from non-threat weather can result in disruption to the flight. For electronically scanned array (ESA) radars, ground clutter echoes are exacerbated due to the higher sidelobe content. Additionally, small antennas typically have a single, static windshear threshold for determining whether to issue or suppress a windshear alert; such a single, static windshear threshold for small antennas can result in excessive false alerts or nuisance alerts that can be caused by ground clutter depending on, for example, a geographic location of an aircraft and time of year.

SUMMARY

In one aspect, embodiments of the inventive concepts disclosed herein are directed to a system. The system may include a radar receiver, a computer readable medium, and at least one processor communicatively coupled to the radar receiver and the computer readable medium. A data structure may be maintained in the computer readable medium. The data structure may contain historical information pertaining to weather conditions for multiple locations. The at least one processor may be configured to: obtain aircraft data associated with an aircraft, the aircraft data including information of an aircraft position of the aircraft; obtain external data from offboard of the aircraft; obtain, from the computer readable medium, at least a portion of the historical information pertaining to a location corresponding to the aircraft position; obtain, at least from the radar receiver, weather radar data; analyze the weather radar data to determine if windshear exceeds a windshear alert threshold; upon an occurrence of the windshear exceeding the windshear alert threshold, determine whether to issue or suppress a windshear alert based at least on at least one of: the aircraft data, the external data, or the at least a portion of the historical information pertaining to the location corresponding to the aircraft position; and one of a) upon an occurrence of a determination to issue the windshear alert, output the windshear alert for presentation to a user or b) upon an occurrence of a determination to suppress the windshear alert, at least one of adjust the windshear alert threshold causing the windshear alert to be suppressed or suppress the windshear alert.

In a further aspect, embodiments of the inventive concepts disclosed herein are directed to a method. The method may include: obtaining, by at least one processor communicatively coupled to a radar receiver and at least one computer readable medium, aircraft data associated with an aircraft, the aircraft data including information of an aircraft position of the aircraft, wherein a data structure is maintained in the at least one computer readable medium, wherein the data structure contains historical information pertaining to weather conditions for multiple locations; obtaining, by the at least one processor, external data from offboard of the aircraft; obtaining, by the at least one processor from the at least one computer readable medium, at least a portion of the historical information pertaining to a location corresponding to the aircraft position; obtaining, by the at least one processor at least from the radar receiver, weather radar data; analyzing, by the at least one processor, the weather radar data to determine if windshear exceeds a windshear alert threshold; upon an occurrence of the windshear exceeding the windshear alert threshold, determining, by the at least one processor, whether to issue or suppress a windshear alert based at least on at least one of: the aircraft data, the external data, or the at least a portion of the historical information pertaining to the location corresponding to the aircraft position; and one of a) upon an occurrence of a determination to issue the windshear alert, outputting, by the at least one processor, the windshear alert for presentation to a user or b) upon an occurrence of a determination to suppress the windshear alert, at least one of adjusting, by the at least one processor, the windshear alert threshold causing the windshear alert to be suppressed or suppressing, by the at least one processor, the windshear alert.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
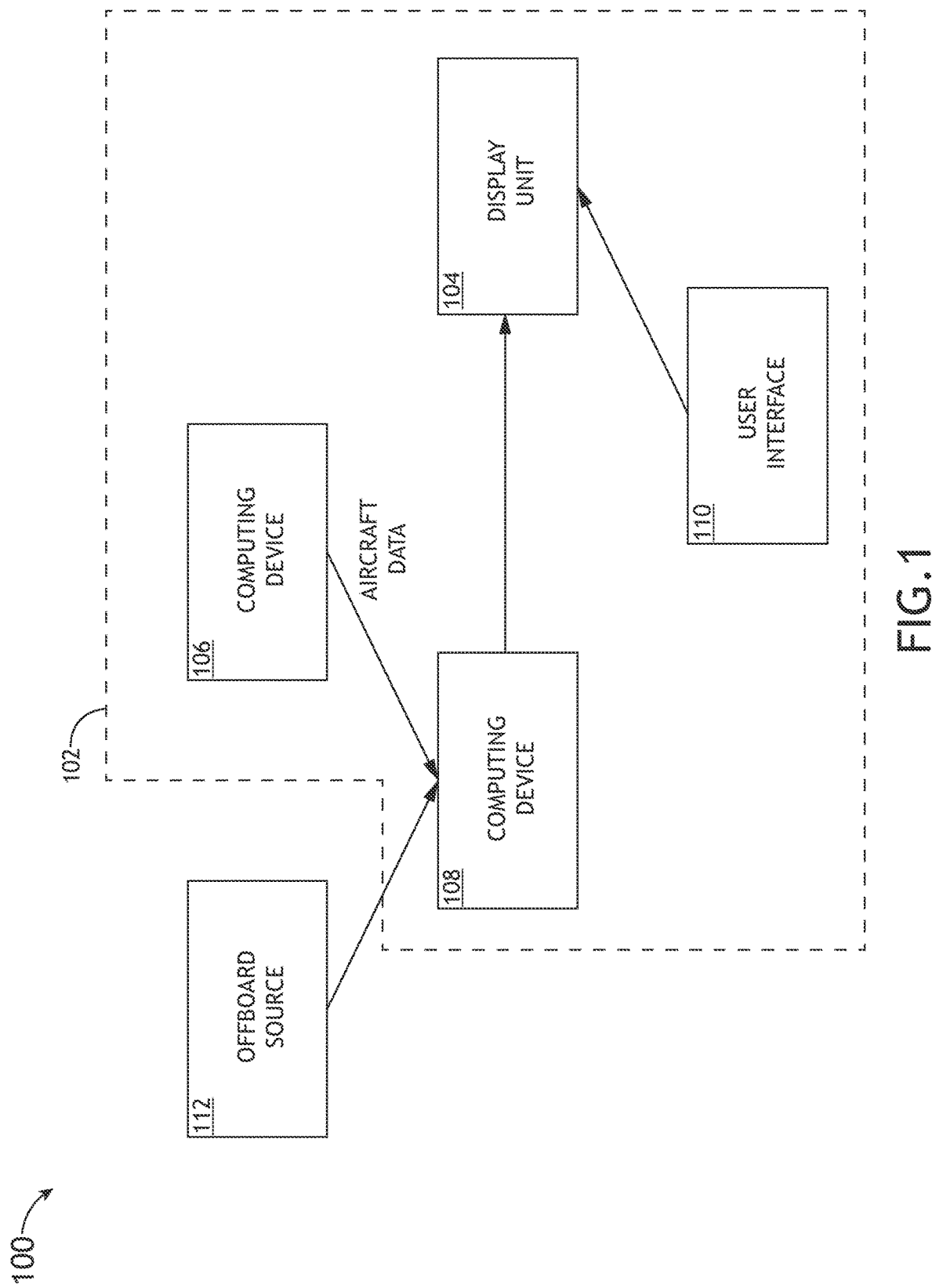
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a system (e.g., an aircraft system) and a method configured to determine whether to issue or suppress a windshear alert based at least on aircraft data, external data, and/or historical information pertaining to a location corresponding to an aircraft position of an aircraft.

Some embodiments may provide enhancements to antenna (e.g., small antenna) windshear detection using external and geographical weather data.

In some embodiments, the probability of nuisance alerts can be greatly reduced by using external data and a priori knowledge of local conditions an aircraft is operating in. The radar can receive external weather information such as reflectivity, temperature, winds, etc., from any suitable offboard source and use the external data to set windshear alert thresholds. Similarly, knowledge of local weather conditions can also be used to set alerting thresholds. Automatic weather radars typically have a built-in data structure (e.g., a table) of weather conditions based on geographic location and season. For example, the probability of windshear occurrences is low during winter months, especially in areas such as New York (known for causing nuisance alerts). The radar can therefore adjust the windshear alert threshold to a stricter threshold if the aircraft is at JFK airport during winter, thereby reducing nuisance alerts.

In some embodiments, accurately detecting microbursts is important to developing an ESA radar for autonomous operation. Mitigating false windshear alerts due to ground clutter is important for achieving full minimum operating standard (MOPS) compliance. Adaptively adjusting the detection thresholds based on external and/or geographical data may provide a path towards full MOPS compliance.

Referring now to FIGS. 1-4, an exemplary embodiment of a system 100 according to the inventive concepts disclosed herein is depicted. In some embodiments, the system 100 may include at least one offboard source 112 and/or an aircraft 102, which may include at least one user (e.g., flight crew and/or pilot(s)), at least one display unit computing device 104, at least one aircraft computing device 106, at least one radar computing device 108 (e.g., a weather radar computing device, such as an ESA weather radar computing device), and/or at least one user interface 110, some or all of which may be communicatively coupled at any given time. In some embodiments, the at least one display unit computing device 104, the at least one aircraft computing device 106, the at least one radar computing device 108, and/or the at least one user interface 110 may be implemented as a single computing device or any number of computing devices configured to perform (e.g., collectively perform if more than one computing device) any or all of the operations disclosed throughout. For example, the at least one display unit computing device 104, the at least one aircraft computing device 106, the at least one radar computing device 108, and/or the at least one user interface 110 may be installed in the aircraft 102. In some embodiments, the at least one display unit computing device 104, the at least one aircraft computing device 106, the at least one radar computing device 108, the at least one user interface 110, and/or a user (e.g., a remote pilot or remote crewmember) may be located offboard of the aircraft 102, for example, if a given aircraft 102 is a remote piloted aircraft (e.g., an unmanned aerial vehicle (UAV) or a drone aircraft).

For example, the user may be a pilot or crew member. The user may interface with the system 100 via the at least one user interface 110. The at least one user interface 110 may be implemented as any suitable user interface, such as a control panel, a touchscreen (e.g., of the display unit computing device 104 and/or another display unit), a multipurpose control panel, a control panel integrated into a flight deck, a cursor control panel (CCP) (sometimes referred to as a display control panel (DCP)), a keyboard, a mouse, a trackpad, at least one hardware button, a switch, an eye tracking system, and/or a voice recognition system. The user interface 110 may be configured to receive at least one user input and to output the at least one user input to a computing device (e.g., 104, 106, and/or 108). For example, a pilot of the aircraft 102 may be able to interface with the user interface 110 to: make a user selection and/or make a mode selection for the display unit computing device 104. For example, such user inputs may be output to the radar computing device 108 and/or the display unit computing device 104.

Figure 2:
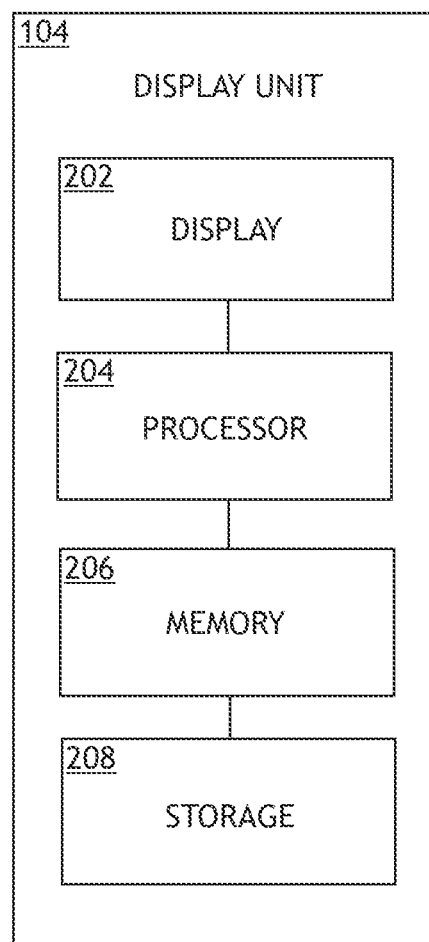
FIG. 2 is a view of an exemplary embodiment of a display unit computing device of the system of FIG. 1 according to the inventive concepts disclosed herein.

The display unit computing device 104 may be implemented as any suitable computing device, such as a primary flight display (PFD) computing device, a weather radar display computing device (e.g., a vertical situation display (VSD) computing device and/or a horizontal situation display), and/or a multi-function window (MFW) display computing device. As shown in FIG. 2, the display unit computing device 104 may include at least one display 202, at least one processor 204, at least one memory 206, and/or at least one storage 208, some or all of which may be communicatively coupled at any given time. For example, the at least one processor 204 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 204 may include a CPU and a GPU configured to perform (e.g., collectively perform) any of the operations disclosed throughout. The processor 204 may be configured to run various software applications (e.g., a weather radar display application, a PFD application, and/or an MFW application) or computer code stored (e.g., maintained) in a non-transitory computer-readable medium (e.g., memory 206 and/or storage 410) and configured to execute various instructions or operations. The processor 204 may be configured to perform any or all of the operations disclosed throughout. For example, the processor 204 may be configured to: receive a windshear alert (e.g., a microburst alert) (e.g., from the radar computing device 108); and/or output the windshear alert as graphical data to the display 202. The display 202 may be configured to display the windshear alert to a user, as well as other information.

Figure 3:
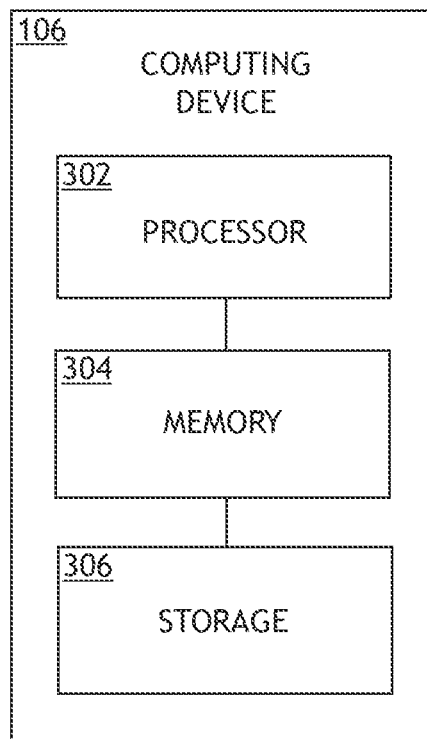
FIG. 3 is a view of an exemplary embodiment of an aircraft computing device of the system of FIG. 1 according to the inventive concepts disclosed herein.
Figure 4:
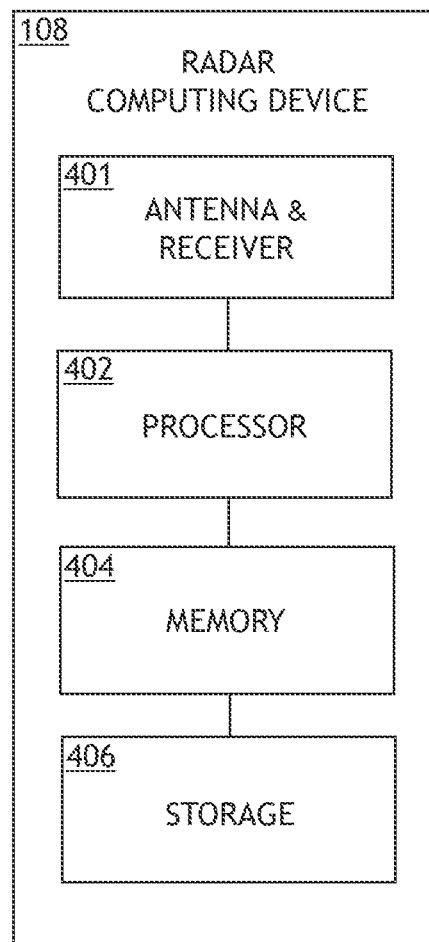
FIG. 4 is a view of an exemplary embodiment of a radar computing device of the system of FIG. 1 according to the inventive concepts disclosed herein.

The at least one aircraft computing device 106 may be implemented as any suitable computing device, such as a flight management system (FMS) computing device, a flight data computer, an inertial reference unit (IRU), or a global positioning system (GPS) device. The at least one aircraft computing device 106 may include any or all of the elements, as shown in FIG. 3. For example, the aircraft computing device 106 may include at least one processor 302, at least one memory 304, and/or at least one storage 306, some or all of which may be communicatively coupled at any given time. For example, the at least one processor 302 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 302 may include a CPU and a GPU configured to perform (e.g., collectively perform) any of the operations disclosed throughout. The processor 302 may be configured to run various software applications (e.g., an FMS application, a flight data computer application, an IRU application, and/or a GPS application) or computer code stored (e.g., maintained) in a non-transitory computer-readable medium (e.g., memory 304 and/or storage 306) and configured to execute various instructions or operations. The processor 302 of the aircraft computing device 106 may be configured to perform any or all of the operations disclosed throughout. For example, the processor 302 of the computing device 106 may be configured to: output aircraft data (e.g., information of altitude of the aircraft 102, information of a position of the aircraft 102, information of a flight plan, information of an air temperature outside of the aircraft 102, a latitude of the aircraft 102, a longitude of the aircraft 102, a windspeed at the aircraft 102, FMS data, flight path data, GPS data, inertial reference unit (IRU) data, flight data, and/or flight computer data) to the display unit computing device 104 and/or the radar computing device 108.

The at least one radar computing device 108 may be implemented as any suitable computing device, such as a weather radar computing device (e.g., an ESA weather radar computing device and/or an ESA automatic weather radar computing device). The at least one radar computing device 108 may include any or all of the elements shown in FIG. 4. For example, the radar computing device 108 may include at least one radar antenna and/or at least one receiver 401 (e.g., at least one weather radar antenna (e.g., at least one ESA weather radar antenna or at least one ESA automatic weather radar antenna) and/or at least one weather radar receiver), at least one processor 402, at least one memory 404, and/or at least one storage 406, some or all of which may be communicatively coupled at any given time. For example, the at least one processor 402 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 402 may include a CPU and a GPU configured to perform (e.g., collectively perform) any of the operations disclosed throughout. The processor 402 may be configured to run various software applications (e.g., a radar application) or computer code stored (e.g., maintained) in a non-transitory computer-readable medium (e.g., memory 404 and/or storage 406) and configured to execute various instructions or operations. The computer-readable medium (e.g., memory 404 and/or storage 406) may maintain a data structure (e.g., a table), wherein the data structure may contain historical information pertaining to weather conditions for multiple locations. For example, at least a portion of the historical information may include information of a freezing layer height for an area including a location for a current time of year and/or average vertical reflectivity profile of storms for the area including the location for the current time of year. The processor 402 of the radar computing device 108 may be configured to perform any or all of the operations disclosed throughout. For example, the processor 402 may be configured to: obtain (e.g., from the aircraft computing device 106) aircraft data associated with an aircraft 102, the aircraft data including information of an aircraft position of the aircraft 102, a latitude of the aircraft 102, a longitude of the aircraft 102, an air temperature around the aircraft 102, and/or a windspeed at the aircraft 102; obtain (e.g., from the offboard source 112 (e.g., a satellite(s) and/or a ground radar system(s))) external data from offboard of the aircraft 102, wherein the external data may include information of reflectivity from ground radar (e.g., Next Generation Weather Radar (NEXRAD)), satellite data (e.g., satellite weather data), wind information, Meteorological Aviation Report (METAR) data, and/or other weather information; obtain, from the at least one computer readable medium, at least a portion of the historical information pertaining to a location corresponding to the aircraft position; obtain, from the radar receiver 401 and/or the at least one offboard source 112, weather radar data; analyze the weather radar data to determine if windshear exceeds a windshear alert threshold (e.g., a microburst alert threshold); upon an occurrence of the windshear exceeding the windshear alert threshold, determine whether to issue or suppress a windshear alert (e.g., a microburst alert) based at least on the aircraft data, the external data, and/or the at least a portion of the historical information pertaining to the location corresponding to the aircraft position; upon an occurrence of a determination to issue the windshear alert, output the windshear alert for presentation to a user; upon an occurrence of a determination to suppress the windshear alert, adjust the windshear alert threshold causing the windshear alert to be suppressed and/or suppress the windshear alert; and/or output the windshear alert to the display unit computing device 104 and/or the display 202 upon the occurrence of the determination to issue the windshear alert.

Additionally, for example, the processor 402 may be further configured to: upon the occurrence of the determination to suppress the windshear alert, at least one of adjust the windshear alert threshold causing the windshear alert to be suppressed or suppress the windshear alert. Additionally, for example, the processor 402 may be further configured to: upon the occurrence of the determination to suppress the windshear alert, adjust the windshear alert threshold causing the windshear alert to be suppressed. For example, the adjustment of the windshear alert threshold may result in a reduction of false windshear alerts caused by ground clutter that would otherwise cause the weather radar data to exceed the windshear alert threshold. Further, for example, the processor 402 may be further configured to: upon the occurrence of the determination to suppress the windshear alert, suppress the windshear alert, wherein a suppression of the windshear alert may result in a reduction of an issuance of a false windshear alert caused by ground clutter that would otherwise cause the windshear alert to issue.

For example, at least one processor (e.g., the at least one processor 204, the at least one processor 302, and/or the at least one processor 402) may be configured to (e.g., collectively configured to, if more than one processor): obtain (e.g., from the aircraft computing device 106) aircraft data associated with an aircraft 102, the aircraft data including information of an aircraft position of the aircraft 102, a latitude of the aircraft 102, a longitude of the aircraft 102, an air temperature around the aircraft 102, and/or a windspeed at the aircraft 102; obtain (e.g., from the offboard source 112 (e.g., a satellite(s) and/or a ground radar system(s))) external data from offboard of the aircraft 102, wherein the external data may include information of reflectivity from ground radar (e.g., Next Generation Weather Radar (NEXRAD)), satellite data (e.g., satellite weather data), wind information, Meteorological Aviation Report (METAR) data, and/or other weather information; obtain, from the at least one computer readable medium, at least a portion of the historical information pertaining to a location corresponding to the aircraft position; obtain, from the radar receiver 401 and/or the at least one offboard source 112, weather radar data; analyze the weather radar data to determine if windshear exceeds a windshear alert threshold (e.g., a microburst alert threshold); upon an occurrence of the windshear exceeding the windshear alert threshold, determine whether to issue or suppress a windshear alert (e.g., a microburst alert) based at least on the aircraft data, the external data, and/or the at least a portion of the historical information pertaining to the location corresponding to the aircraft position; upon an occurrence of a determination to issue the windshear alert, output the windshear alert for presentation to a user; upon an occurrence of a determination to suppress the windshear alert, adjust the windshear alert threshold causing the windshear alert to be suppressed and/or suppress the windshear alert; and/or output the windshear alert to the display unit computing device 104 and/or the display 202 upon the occurrence of the determination to issue the windshear alert.

At least one processor (e.g., the at least one processor 204, the at least one processor 302, and/or the at least one processor 402) of the aircraft 102 may be configured to perform (e.g., collectively perform) any or all of the operations disclosed throughout.

Figure 5:
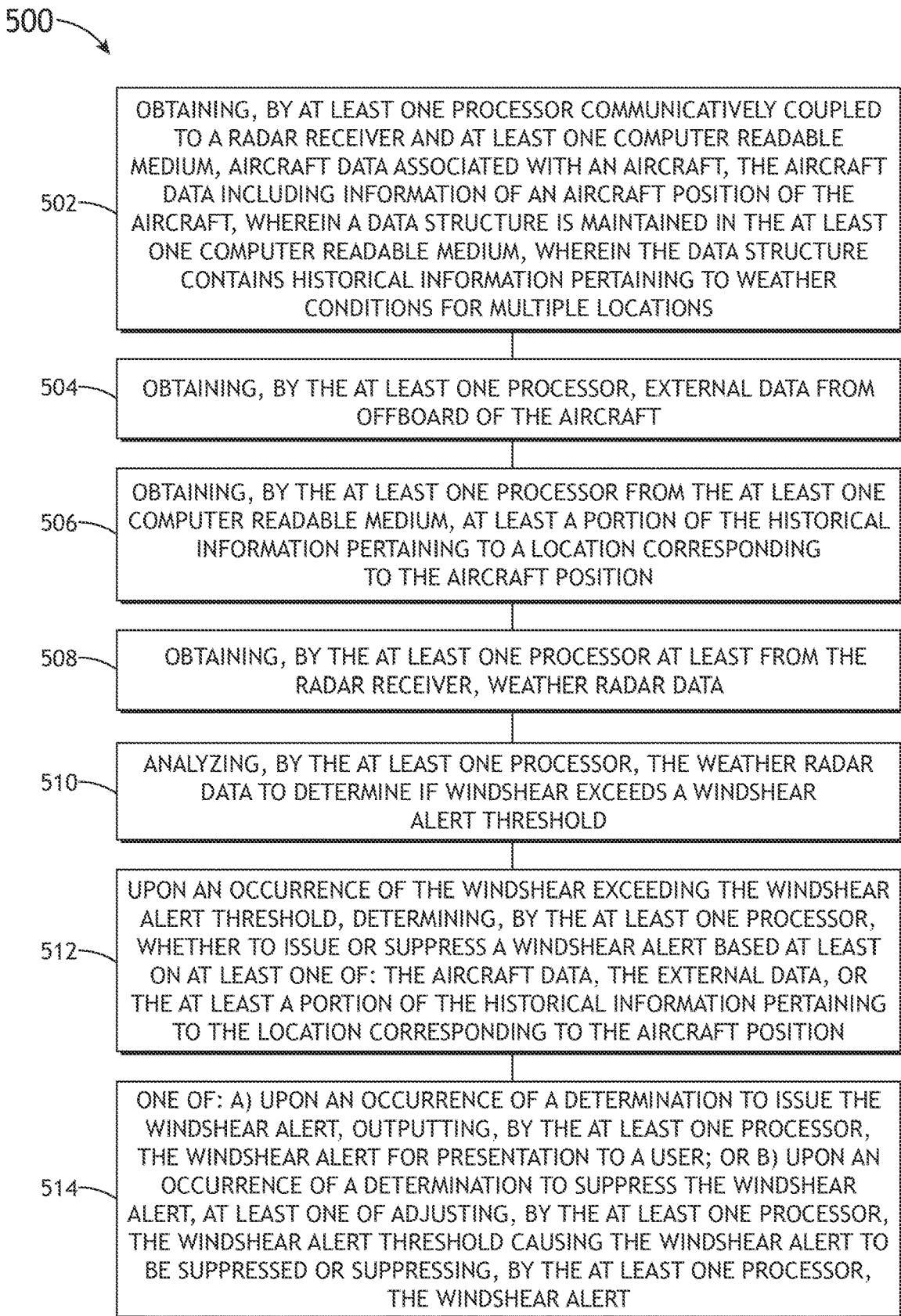
FIG. 5 is a diagram of an exemplary embodiment of a method according to the inventive concepts disclosed herein.

Referring now to FIG. 5, an exemplary embodiment of a method 500 according to the inventive concepts disclosed herein may include one or more of the following steps. Additionally, for example, some embodiments may include performing one or more instances of the method 500 iteratively, concurrently, and/or sequentially. Additionally, for example, at least some of the steps of the method 500 may be performed in parallel and/or concurrently. Additionally, in some embodiments, at least some of the steps of the method 500 may be performed non-sequentially.

A step 502 may include obtaining, by at least one processor communicatively coupled to a radar receiver and at least one computer readable medium, aircraft data associated with an aircraft, the aircraft data including information of an aircraft position of the aircraft, wherein a data structure is maintained in the at least one computer readable medium, wherein the data structure contains historical information pertaining to weather conditions for multiple locations.

A step 504 may include obtaining, by the at least one processor, external data from offboard of the aircraft.

A step 506 may include obtaining, by the at least one processor from the at least one computer readable medium, at least a portion of the historical information pertaining to a location corresponding to the aircraft position.

A step 508 may include obtaining, by the at least one processor at least from the radar receiver, weather radar data.

A step 510 may include analyzing, by the at least one processor, the weather radar data to determine if windshear exceeds a windshear alert threshold.

A step 512 may include upon an occurrence of the windshear exceeding the windshear alert threshold, determining, by the at least one processor, whether to issue or suppress a windshear alert based at least on at least one of: the aircraft data, the external data, or the at least a portion of the historical information pertaining to the location corresponding to the aircraft position.

A step 514 may include one of: a) upon an occurrence of a determination to issue the windshear alert, outputting, by the at least one processor, the windshear alert for presentation to a user; or b) upon an occurrence of a determination to suppress the windshear alert, at least one of adjusting, by the at least one processor, the windshear alert threshold causing the windshear alert to be suppressed or suppressing, by the at least one processor, the windshear alert.

Further, the method 500 may include any of the operations disclosed throughout.

As will be appreciated from the above, embodiments of the inventive concepts disclosed herein may be directed to a system (e.g., an aircraft system) and a method configured to determine whether to issue or suppress a windshear alert based at least on aircraft data, external data, and/or historical information pertaining to a location corresponding to an aircraft position of an aircraft.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
   a radar receiver;
   at least one non-transitory computer readable medium, wherein a data structure is maintained in the at least one non-transitory computer readable medium, wherein the data structure contains historical information pertaining to weather conditions for multiple locations; and
   at least one processor communicatively coupled to the radar receiver and the at least one non-transitory computer readable medium, the at least one processor configured to:
      obtain aircraft data associated with an aircraft, the aircraft data including information of an aircraft position of the aircraft;
      obtain external data from offboard of the aircraft;
      obtain, from the at least one non-transitory computer readable medium, at least a portion of the historical information pertaining to a location corresponding to the aircraft position;
      obtain, at least from the radar receiver, weather radar data;
      analyze the weather radar data to determine if windshear exceeds a windshear alert threshold;
      upon an occurrence of the windshear exceeding the windshear alert threshold, determine whether to issue or suppress a windshear alert based at least on at least one of: the aircraft data, the external data, or the at least a portion of the historical information pertaining to the location corresponding to the aircraft position; and
   one of:
      a) upon an occurrence of a determination to issue the windshear alert, output the windshear alert for presentation to a user; or
      b) upon an occurrence of a determination to suppress the windshear alert, at least one of adjust the windshear alert threshold causing the windshear alert to be suppressed or suppress the windshear alert;
   wherein the at least the portion of the historical information pertaining to the location corresponding to the aircraft position includes information of at least one of: freezing layer height for an area including the location for a current time of year or average vertical reflectivity profile of storms for the area including the location for the current time of year.

2. The system of claim 1, further comprising a display communicatively coupled to the at least one processor, wherein the display is configured to display the windshear alert to the user upon the occurrence of the determination to issue the windshear alert.

3. The system of claim 2, wherein the display, the at least one processor, the at least one non-transitory computer readable medium, and the radar receiver are installed at least one of in or on the aircraft.

4. The system of claim 1, wherein the windshear alert threshold is a microburst alert threshold, wherein the windshear alert is a microburst alert.

5. The system of claim 1, wherein the aircraft data further includes information of at least one of: latitude of the aircraft, longitude of the aircraft, air temperature around the aircraft, or windspeed at the aircraft.

6. The system of claim 1, wherein the external data includes information of at least one of: reflectivity from ground radar, satellite data, wind information, or Meteorological Aviation Report (METAR) data.

7. The system of claim 1, wherein the at least one processor is further configured to: upon the occurrence of the determination to suppress the windshear alert, at least one of adjust the windshear alert threshold causing the windshear alert to be suppressed or suppress the windshear alert.

8. The system of claim 7, wherein the at least one processor is further configured to: upon the occurrence of the determination to suppress the windshear alert, adjust the windshear alert threshold causing the windshear alert to be suppressed.

9. The system of claim 8, wherein the adjustment of the windshear alert threshold results in a reduction of false windshear alerts caused by ground clutter that would otherwise cause the weather radar data to exceed the windshear alert threshold.

10. The system of claim 7, wherein the at least one processor is further configured to: upon the occurrence of the determination to suppress the windshear alert, suppress the windshear alert, wherein a suppression of the windshear alert results in a reduction of an issuance of a false windshear alert caused by ground clutter that would otherwise cause the windshear alert to issue.

11. The system of claim 1, wherein the at least one processor is further configured to: upon an occurrence of the windshear exceeding the windshear alert threshold, determine whether to issue or suppress a windshear alert based at least on the aircraft data, the external data, and the at least a portion of the historical information pertaining to the location corresponding to the aircraft position.

12. The system of claim 1, wherein the user is located offboard of the aircraft.

13. The system of claim 1, further comprising an electronically scanned array (ESA) antenna communicatively coupled to the radar receiver.

14. A method, comprising:
obtaining, by at least one processor communicatively coupled to a radar receiver and at least one non-transitory computer readable medium, aircraft data associated with an aircraft, the aircraft data including information of an aircraft position of the aircraft, wherein a data structure is maintained in the at least one non-transitory computer readable medium, wherein the data structure contains historical information pertaining to weather conditions for multiple locations;
obtaining, by the at least one processor, external data from offboard of the aircraft;
obtaining, by the at least one processor from the at least one non-transitory computer readable medium, at least a portion of the historical information pertaining to a location corresponding to the aircraft position;
obtaining, by the at least one processor at least from the radar receiver, weather radar data;
analyzing, by the at least one processor, the weather radar data to determine if windshear exceeds a windshear alert threshold;
upon an occurrence of the windshear exceeding the windshear alert threshold, determining, by the at least one processor, whether to issue or suppress a windshear alert based at least on at least one of: the aircraft data, the external data, or the at least a portion of the historical information pertaining to the location corresponding to the aircraft position; and
one of:
a) upon an occurrence of a determination to issue the windshear alert, outputting, by the at least one processor, the windshear alert for presentation to a user; or
b) upon an occurrence of a determination to suppress the windshear alert, at least one of adjusting, by the at least one processor, the windshear alert threshold causing the windshear alert to be suppressed or suppressing, by the at least one processor, the windshear alert,
wherein the at least the portion of the historical information pertaining to the location corresponding to the aircraft position includes information of at least one of: freezing layer height for an area including the location for a current time of year or average vertical reflectivity profile of storms for the area including the location for the current time of year.

15. A system, comprising:
a radar receiver;
at least one non-transitory computer readable medium, wherein a data structure is maintained in the at least one non-transitory computer readable medium, wherein the data structure contains historical information pertaining to weather conditions for multiple locations; and
at least one processor communicatively coupled to the radar receiver and the at least one non-transitory computer readable medium, the at least one processor configured to:
obtain aircraft data associated with an aircraft, the aircraft data including information of an aircraft position of the aircraft;
obtain external data from offboard of the aircraft;
obtain, from the at least one non-transitory computer readable medium, at least a portion of the historical information pertaining to a location corresponding to the aircraft position;
obtain, at least from the radar receiver, weather radar data;
analyze the weather radar data to determine if windshear exceeds a windshear alert threshold;
upon an occurrence of the windshear exceeding the windshear alert threshold, determine whether to issue or suppress a windshear alert based at least on at least one of: the aircraft data, the external data, or the at least a portion of the historical information pertaining to the location corresponding to the aircraft position; and
upon an occurrence of a determination to suppress the windshear alert, adjust the windshear alert threshold causing the windshear alert to be suppressed.

16. The system of claim 15, wherein the adjustment of the windshear alert threshold results in a reduction of false windshear alerts caused by ground clutter that would otherwise cause the weather radar data to exceed the windshear alert threshold.

17. A system, comprising:
a radar receiver;
at least one non-transitory computer readable medium, wherein a data structure is maintained in the at least one non-transitory computer readable medium, wherein the data structure contains historical information pertaining to weather conditions for multiple locations; and
at least one processor communicatively coupled to the radar receiver and the at least one non-transitory computer readable medium, the at least one processor configured to:
obtain aircraft data associated with an aircraft, the aircraft data including information of an aircraft position of the aircraft;
obtain external data from offboard of the aircraft;
obtain, from the at least one non-transitory computer readable medium, at least a portion of the historical information pertaining to a location corresponding to the aircraft position;
obtain, at least from the radar receiver, weather radar data;
analyze the weather radar data to determine if windshear exceeds a windshear alert threshold;
upon an occurrence of the windshear exceeding the windshear alert threshold, determine whether to issue or suppress a windshear alert based at least on at least one of: the aircraft data, the external data, or the at least a portion of the historical information pertaining to the location corresponding to the aircraft position; and upon an occurrence of a determination to suppress the windshear alert, suppress the windshear alert, wherein a suppression of the windshear alert results in a reduction of an issuance of a false windshear alert caused by ground clutter that would otherwise cause the windshear alert to issue.

* * * * *